United States Patent

Srhoj

Patent Number: 5,540,124
Date of Patent: Jul. 30, 1996

[54] ADJUSTABLE GRIPPING DEVICE

[76] Inventor: Edward B. Srhoj, 8 Ferguson Street, Alfred Cove, Western Australia 6154, Australia

[21] Appl. No.: 360,725
[22] PCT Filed: Jun. 21, 1993
[86] PCT No.: PCT/AU93/00299
§ 371 Date: Dec. 19, 1994
§ 102(e) Date: Dec. 19, 1994
[87] PCT Pub. No.: WO94/00276
PCT Pub. Date: Jan. 6, 1994

[30] Foreign Application Priority Data

Jun. 19, 1992 [AU] Australia .................. PL 3022

[51] Int. Cl.⁶ .................................................. B25B 13/18
[52] U.S. Cl. .................................. 81/128; 279/64
[58] Field of Search .................. 81/128; 279/49, 279/56, 59, 62, 64

[56] References Cited

U.S. PATENT DOCUMENTS

| 1,390,738 | 9/1921 | Williams. | |
|---|---|---|---|
| 1,395,585 | 11/1921 | Kizer. | |
| 1,413,444 | 4/1922 | Williams. | |
| 1,526,328 | 2/1925 | Englund | 81/128 X |
| 4,608,887 | 9/1986 | Colvin | 81/128 |
| 4,892,016 | 1/1990 | Anderson | 81/128 |

FOREIGN PATENT DOCUMENTS

| 611331 | 2/1926 | France. |
| 360271 | 9/1922 | Germany. |
| 141736 | 4/1920 | United Kingdom. |
| 851798 | 10/1960 | United Kingdom. |

Primary Examiner—James G. Smith
Attorney, Agent, or Firm—Hoffman, Wasson & Gitler, P.C.

[57] ABSTRACT

An adjustable gripping device (10) in the nature of an adjustable socket including a body (11) supporting a stem (14) having arcuate guide surfaces (16) along which gripping jaws (19) slide. The gripping jaws (19) include teeth (23) on their outer surfaces and a rotatable adjuster (24) is provided with an internal thread (27) for cooperation with the teeth (23) such that when the adjuster (24) is rotated in opposite directions, the jaws (19) move inwardly and outwardly.

15 Claims, 2 Drawing Sheets

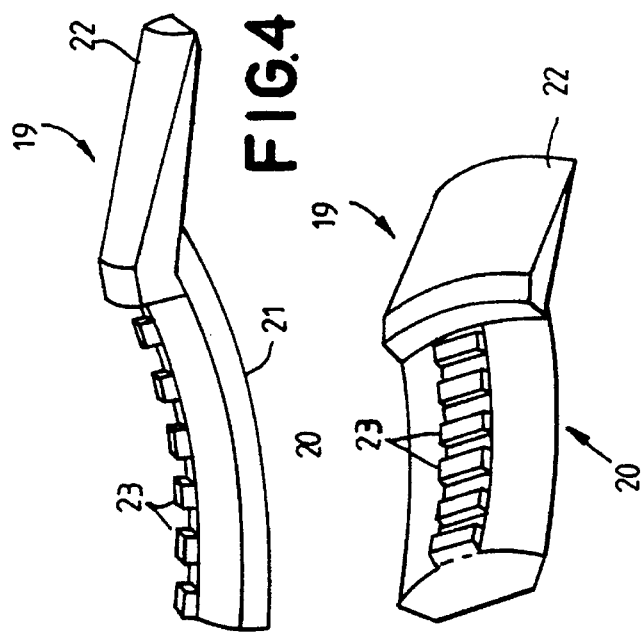
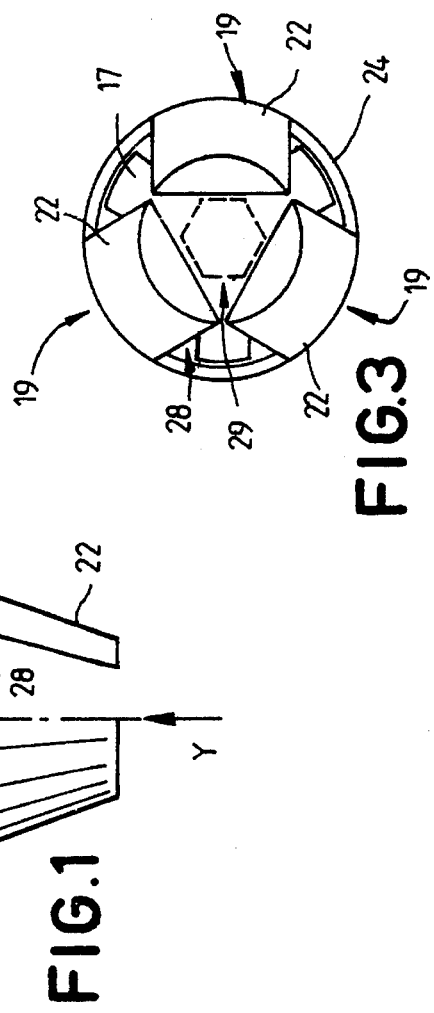
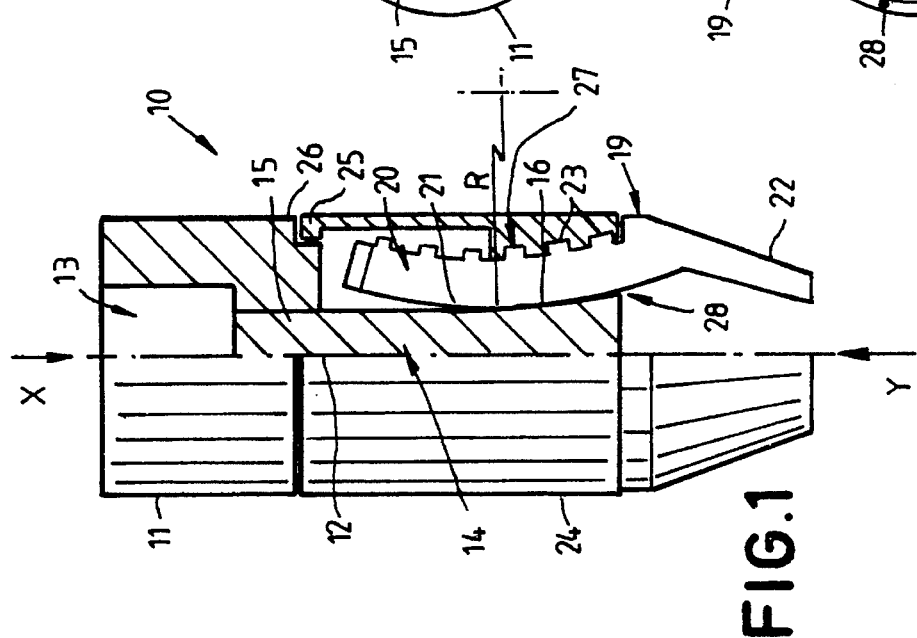

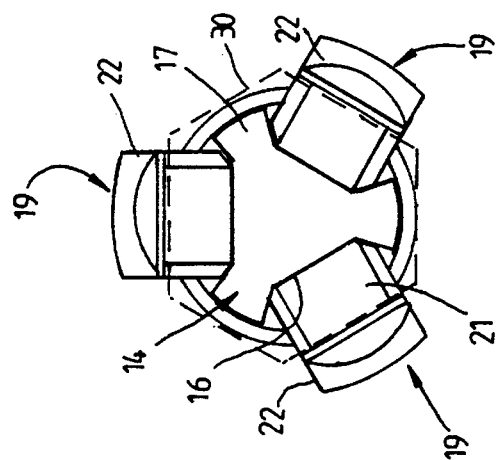
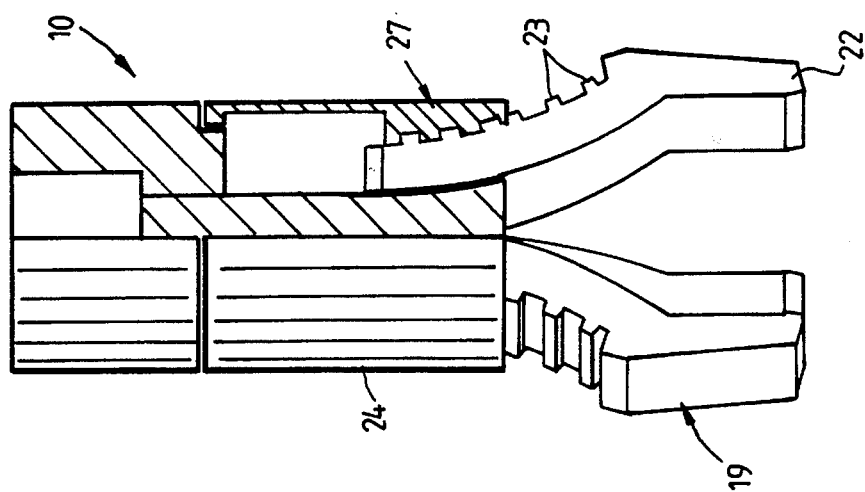
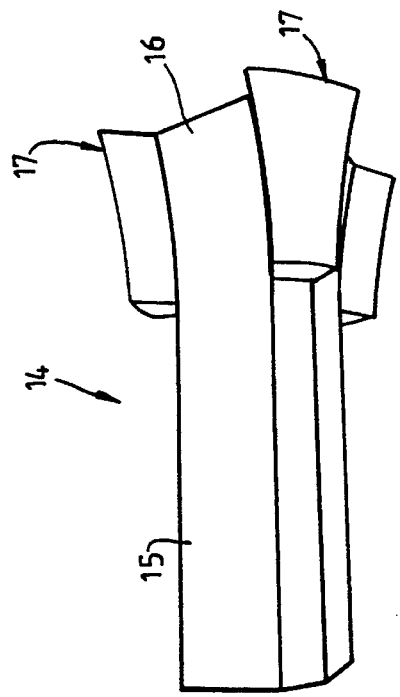

5,540,124

ADJUSTABLE GRIPPING DEVICE

TECHNICAL FIELD

This invention relates to an adjustable gripping device which in a particular aspect is in the form of an adjustable socket.

1. Background Art

Socket sets are a common tool used for driving bolts and nuts. Usually such sockets sets comprise a plurality of sockets of different sizes to suit different sized nuts or bolts. Use of such sockets is often inconvenient where for example many different size nuts or bolts are encountered as different sockets are required to be individually detached from the driving tool or wrench and the correct sized socket reattached to suit the particular size nut or bolt to be driven. Inconvenience also often arises if a particular size socket is not readily available.

Some adjustable sockets have been proposed in the past to overcome the above problem, however, the known adjustable have a number of disadvantages. For example such adjustable sockets are generally relatively complex with some involving springs to bias gripping jaws outwardly. The use of springs often causes difficulties in manufacture and use. Other adjustable sockets such as those disclosed in International Patent Application No. PCT/AU86/01319 have jaws with a limited range of opening so that their application is limited. Additionally most adjustable sockets have dimensions which make them unsuitable for use in confined spaces.

2. Disclosure of the Invention

The present invention aims to overcome or at least alleviate one or more of the above disadvantages by providing an adjustable gripping device which may be in the form of an adjustable socket which is of simple construction such as to lend itself to easy manufacture. The present invention in a preferred form aims to provide an adjustable gripping device which may be constructed so as to have relatively small overall dimensions whereby to enable it to be used in confined spaces. The present invention further preferably aims to provide an adjustable gripping device in which the range of jaw openings is relatively large so as to facilitate gripping of members of a range of different sizes. Other objects and advantages of the invention will become apparent from the following description.

With the above and other objects in view the present invention provides in a first aspect an adjustable gripping device including a body adapted to be driven for rotation about a central axis, a plurality of jaws spaced about said central axis and supported for movement relative to said body and adjuster means mounted to said body and rotatable relative thereto about said central axis, said adjuster means co-operating with said jaws and adapted when rotated to move said jaws along an arcuate path longitudinally of said body and radially inwardly or outwardly relative to said central axis.

The body preferably supports or includes a guide with which each jaw co-operates, each jaw being in bearing engagement with the guide. Preferably the jaws have an arcuate portion or shank and the guide has corresponding arcuate guide surfaces adapted to receive in a complementary manner, the respective arcuate portions or shanks of the jaws so that the jaws are guided along their arcuate path of movement. Preferably the guide and adjuster means define therebetween respective slots through which each jaw projects, each jaw moving inwardly and outwardly of its associated slot upon rotation of the adjuster means. The arcuate guide surfaces of the guide are separated by longitudinally extending ribs so that the jaws are constrained for longitudinal and radial movement as described.

Preferably each jaw is provided with a plurality of teeth and the adjuster means is provided with an internal thread adapted to be engaged by the teeth on the jaws whereby the cooperation between the thread and teeth causes movement of the jaws both longitudinally and radially relative to the body upon rotation of the adjuster means.

The thread on the adjuster means suitably has a pitch circle which increases in diameter longitudinally of the body so to be of generally bell shaped form to match the curvature of the guide and arcuate shank of the jaws.

The adjuster means may be of tubular or sleeve like form or may have an external surface which flares outwardly longitudinally so as to have an increased thickness in the region of the thread.

The present invention provides in a further preferred aspect an adjustable socket comprising supporting body means having a longitudinally extending axis, said body having a plurality of slideways spaced about said axis, said slideways being of arcuate form and extending longitudinally of said body means so as to flare outwardly, a plurality of jaws spaced about said central axis and supported for sliding movement along respective said slideways, said jaws having on their external surfaces teeth means, adjuster means rotatable relative to said body about said axis, said adjuster means having an internal thread for co-operation with said teeth means, said adjuster means being adapted to be rotated to cause through co-operation between said teeth means and said thread, movement of said jaws along said slideways and thus radially inwardly or outwardly relative to said central axis.

In a further preferred aspect, the present invention provides an adjustable gripping device comprising guide means having a longitudinally extending axis, said guide means having a plurality of longitudinally extending slideways spaced about said axis, said slideways being of arcuate form, a plurality of jaw means spaced about said central axis, said jaw means having surfaces complementary to said slideways and being supported for sliding movement along respective said slideways, adjuster means disposed about said guide means and jaw means and being rotatable about said axis, said adjuster means having means cooperating with said jaw means and being adapted to be rotated to cause through said cooperation longitudinal movement of said jaw means along said slideways and thus radially inwardly or outwardly relative to said central axis.

BRIEF DESCRIPTION OF THE DRAWINGS

In order that the invention may be more readily understood and put into practical effect, reference will now be made to the accompanying drawings which illustrate a preferred embodiment of the invention and wherein:

FIG. 1 is a half longitudinal sectional view of an adjustable gripping device according to the present invention with the jaws retracted;

FIG. 2 is an end view of the device of FIG. 1 in the direction X;

FIG. 3 is an end view of the device of FIG. 1 in the direction Y;

FIGS. 4 and 5 illustrate a typical jaw for use in the gripping device of the invention;

FIG. 6 illustrates a typical guide for the jaws of the adjustable gripping device of the invention;

FIG. 7 is a half longitudinal section view of the adjustable gripping device of the invention with the jaws in an extended position; and FIG. 8 is an end view of the device with the jaws extended.

DETAILED DESCRIPTION OF THE EMBODIMENTS

Referring to the drawings and firstly to FIGS. 1 to 6 there is illustrated an adjustable gripping device 10 according to the present invention, including a body 11 having a central axis 12 and being provided at one end with a central square recess 13 adapted to be engaged by a correspondingly shaped tang of a driving tool or wrench. Secured to the body 11 or formed integrally therewith is a guide 14 which extends axially of the body 11 along the axis 12.

The guide 14 is, as apparent in FIG. 6 of generally triangular cross section at its end adjacent the body 11 to form a stem 15 which is connected to the body 11. At its opposite end the guide 14 defines three longitudinally extending arcuate slideways or slide surfaces 16. As is apparent, the slideways 16 are arranged about the axis 12 with adjacent slideways 16 disposed at an acute angle to each other and are separated from each other by longitudinally extending ribs 17, the ribs 17 at the free end of the guide 14 having outer arcuate surfaces centred on the axis 12. Both the slideways 16 and ribs 17 flare outwardly towards the free end of the guide 14 so as to lie along arcs centred on, and at a radius R from, an axis 18 located outwardly of the slideways 16 and extending normal to the central axis 12 of the body 11 and guide 14.

Adapted for co-operation with the guide 14 are three jaws 19, each of which includes at one end an arcuate shank 20 which has an inner surface 21 complementary to the arcuate surfaces of the slideways 16. Each shank 20 is adapted to seat within a respective slideway 16 so as to be slidable longitudinally of the slideway 16 whilst being in bearing contact therewith. Each jaw 19 also includes at its opposite free end a gripping portion 22 which is inclined to or extends at an obtuse angle to the shank 20 so as to enable the jaws 19 to grip an object in all positions as described further below. As shown in FIG. 1, the portions are inclined inwardly towards each other in the closed position of the device 10. The shank 20 of each jaw 19 additionally includes on its outer side a plurality of teeth 23 which are spaced longitudinally along the shank 20 and adapted for co-operation with an adjuster 24.

The adjuster 24 is mounted to the body 11 and guide 14 for rotation about the central axis 12. The adjuster 24 is of somewhat tubular or sleeve-like form and includes at one end an annular ring 25 which locates within a correspondingly shaped annular groove 26 in the end of the body 11 whereby to allow for rotational movement of the adjuster 24 relative to the body 11. At its opposite end, the adjuster 24 is internally helically threaded at 27, the thread 27 being formed with an increasing pitch diameter from its inner axial end to its outer axial end so as to be of bell shaped configuration to match the curvature of the slideways 16 and shanks 20. The teeth 23 of the respective shanks 20 are engaged by the helical thread 27 to enable adjusting movement of the jaws 19 as described further below. As is apparent in FIGS. 1 and 3 the adjuster 24 cooperates with the ribs 17 so as to close the open outer sides of the slideways 16 and define slots 28 through which the shanks 20 of the jaws 19 project. The jaw shanks 20 are thus constrained in use for movement along the slideways 16 and between the respective ribs 17.

Upon rotation of the adjuster 24 in opposite directions the co-operation between the thread 27 and teeth 23 on the adjuster 24 and the jaw shanks 20, respectively will cause movement of the jaws 19 longitudinally of the central axis 12 of the device 10 between the position of FIG. 1 and that of FIG. 7. Additionally, as the shanks 20 are moved longitudinally of the body 11 and guide 14 the co-operation between the respective arcuate surfaces of the slideways 16 and the arcuate surfaces 21 of the jaw shanks 20 will constrain the jaws to move radially inwardly and outwardly relative to the axis 12.

Thus in the closed position of FIGS. 1 and 3, the jaw shanks 20 are fully retracted and the gripping portions 22 of the jaws 19 are disposed adjacent to each other to define the minimum gripping size say for gripping the hexagonal nut or bolt head 29 shown in dotted outline. In the fully extended position of the jaw shanks 20, the gripping portions 22 are opened to the position of FIGS. 7 and 8 so as to enable gripping of the hexagonal head 30 shown in dotted outline. It will thus be apparent that the described arrangement allows for a large degree of opening of the jaws 19 so as to enable gripping of a large size range of bolts or nuts.

The gripping device 10 of the present invention is particularly suited to use as a an adjustable socket for gripping hexagonal nuts or bolt heads. The device 10 of the invention however may have applications in gripping other objects such as square sectioned heads of nuts or bolts. In such a configuration, the device 10 may be provided with two opposite jaws or four or more jaws arranged about the axis 12 of the device 10.

The gripping portion 22 of the jaws 19 may if desired by provided on their inner faces with a grip increasing surface finish for example a grooved finish to avoid slipping. In an alternative configuration the inner gripping faces of the gripping portions 22 may have a convex configuration in cross-section so as to engage an article to be gripped along the peak of the convex shape. The outer surface of the adjuster 24 may also suitably be knurled or provided with other surface finish to facilitate gripping and tightening by hand or include configurations to enable tightening by use of a separate tool. The adjuster 24 may also be of outwardly flared form to increase the thickness of the wall about the thread 27 and provide for convenient gripping. Whilst the body 11 of the device 10 is described as having a female square recess 13, it may be provided with a recess of other configurations to suit a driving tool or wrench. Alternatively, the body 11 may be provided with a male configuration such as hexagonal flats on its outer surface or a hexagonal stem to facilitate gripping by a suitable tool. In yet an alternative configuration, the body 11 may be formed integrally with or connected, say through a universal joint, to a wrench or lever arm.

In yet an alternative configuration, the teeth 23 on the jaws 19 may be eliminated as may the threads 27 on the adjuster 24. Longitudinal movement of the jaws 19 may then be achieved by other activating means which for example may engage or be coupled to the rear ends of the jaws 19 to cause longitudinal movement thereof. Such means may include a threaded member whose rotational movement in opposite directions causes longitudinal movement of the jaws 19. The jaws 16 in this configuration would still of course move along an arcuate path as described above.

The device 10 of the invention may also be motor actuated or driven. For example the body 11 may be coupled to a power driven tool or the adjuster 24 may be driven rotatably in opposite directions by a drive motor or drive means of any form for gripping an article for use say in manufacturing operations. Additionally, in some configurations, the body 11 in the form described may be eliminated and the guide 14 secured to or comprised in an alternative form of tool.

Whilst the above has been given by way of illustrative embodiment of the invention, all such modifications and variations thereto as would be apparent to persons skilled in the art are deemed to fall within the broad scope and ambit of the invention as herein set forth.

I claim:

1. An adjustable gripping device including a body adapted to be driven for rotation about a central axis, a plurality of jaws spaced around said central axis and supported for movement relative to said body, a guide extending along said central axis, said guide having a plurality of guide surfaces, each said guide surface extending in a direction longitudinally of said central axis, and being of arcuate form in said longitudinal direction said jaws being slidable along respective said guide surfaces, and adjuster means mounted to said body and rotatable relative thereto about said central axis, said adjuster means cooperating with said jaws and adapted when rotated in opposite directions to move said jaws along said arcuate guide surfaces and thereby radially inwardly or outwardly relative to said central axis.

2. An adjustable gripping device according to claim 1 wherein said adjuster means surrounds said guide, said jaws having at least a portion located between respective said guide surfaces and said adjuster means.

3. An adjustable gripping device according to claim 1 wherein said jaws have arcuate surfaces complementary to said arcuate surfaces of said guide.

4. An adjustable gripping device according to claim 1 wherein said arcuate surfaces of said guide are separated by longitudinally extending ribs, each said jaw having at least a portion located between respective said ribs.

5. An adjustable gripping device according to claim 4 wherein slots are defined between said guide and said adjuster means through which said jaws extend.

6. An adjustable gripping device according to claim 5 wherein said adjuster means includes an internal thread and wherein said jaws include one or more teeth co-operable with said thread such that rotation of said adjuster means causes through said co-operating teeth and thread, said movement of said jaws.

7. An adjustable gripping device according to claim 6 wherein said thread has a .pitch circle which increases in diameter longitudinally relative to said central axis.

8. An adjustable gripping device according to claim 6 wherein said adjuster means comprises a hollow member having said thread located internally at one end thereof.

9. An adjustable gripping device according to claim 8 wherein said hollow member has means at its opposite end for engagement with said body whereby to allow rotatable movement of said adjuster means relative to said body about said central axis.

10. An adjustable gripping device according to claim 1 wherein said jaws include end gripping portions inclined inwardly towards each other in a closed position of said jaws.

11. An adjustable gripping device according to claim 10 wherein said jaws have arcuate shank portions extending from said end gripping portions, said shank portions having inner surfaces complementary to said arcuate guide surfaces of said guide.

12. An adjustable gripping device according to claim 1 wherein said body includes means for engagement with a driving tool.

13. An adjustable gripping device according to claim 12 wherein said engagement means comprises a socket in one end of said body.

14. An adjustable socket comprising supporting body means having a longitudinally extending central axis, said body means having a plurality of slideways spaced around said central axis, said slideways being of arcuate form and extending longitudinally of said body means so as to flare outwardly, a plurality of jaws spaced around said central axis, said jaws having arcuate surfaces complementary to said slideways and arranged for sliding movement thereof, said jaws having arranged for sliding movement therealong, said jaws having on their external surfaces teeth means, adjuster means rotatable relative to said body about said axis, said adjuster means having an internal thread for cooperation with said teeth means, said adjuster means being adapted to be rotated to cause, through cooperation between said teeth means and said thread, movement of said jaws along said slideways and through cooperation between said arcuate surfaces on said jaws and said slideways inward or outward movement of said jaws in a radial direction relative to said central axis.

15. An adjustable gripping device comprising guide means having a longitudinally extending central axis, said guide means having a plurality of longitudinally extending slideways spaced around said axis, said slideways being of arcuate form in a direction longitudinally of said central axis, a plurality of jaw means spaced around said axis, said jaw means having arcuate surfaces complementary to said slideways and being supported for sliding movement along respective said slideways, adjuster means disposed about said guide means and jaw means and being rotatable about said axis, said adjuster means having means cooperating with said jaw means and being adapted to be rotated to cause through said cooperation longitudinal movement of said jaw means along said slideways and through relative sliding movement between said arcuate surfaces of said jaws and said slideways radial inward or outward movement of said jaw means relative to said central axis.

* * * * *